United States Patent Office 2,949,486
Patented Aug. 16, 1960

2,949,486

PROCESS FOR PRODUCTION OF DEHYDRATED ALDOLS

William E. Weesner and Robert A. Heimsch, Dayton, Ohio, assignors to Monsanto Chemical Company, St. Louis, Mo., a corporation of Delaware No Drawing. Filed June 20, 1955, Ser. No. 516,762

2 Claims. (Cl. 260—604)

The present invention relates to a method for conducting a chemical reaction combining the steps of carbonylation and condensation by the use of a combination catalyst. It is an object of the invention to provide a method whereby the carbonylation of lower olefins to produce aldehydes concomitantly results in the production of dehydrated aldols of higher molecular weight than the aldehydes which are normally produced in carbonylation.

The olefins carbonylation process as conducted in the prior art results in the addition of carbon monoxide and hydrogen to lower olefins to give aldehydes containing one more carbon atom. For example, in the carbonylation of propylene, the products which are formed are n-butyraldehyde and isobutyraldehyde.

It has been found that a process may be conducted for the production of dehydrated aldols by contacting an olefin having from 2 to 10 carbon atoms in the presence of carbon monoxide and hydrogen under a pressure of at least 1000 p.s.i. and at a temperature of from 100° to 180° C. in the presence of a specific catalyst, preferably present in the proportion of from 1 to 20 percent by weight relative to the charge of the said olefin. The novel combination catalyst has been found to be of utility throughout the range of proportions of the two component members, and preferably contains from 10 to 90 percent by weight of a compound selected from the group consisting of the oxides, hydroxides and salts of iron, cobalt, and nickel, and from 90 to 10 percent by by weight of a salt selected from the group consisting of the salts of zinc, tin, lead, vanadium, antimony, molybdenum, and manganese.

The present invention is applicable to olefinic compounds such as the lower aliphatic olefins having from 2-10 carbon atoms. However, the process is likewise applicable to aromatic and cycloaliphatic compounds having olefinic unsaturation such as styrene and cyclohexene. The reaction may be carried out by dissolving the combination catalyst as described herein in the reaction mixture or by employing a solvent in order to facilitate the introduction of the catalytic components into the reaction system.

The catalysts contemplated by the present invention are based upon a combination of two components. The first component is an oxide, hydroxide or a salt of a metal of the group consisting of iron, cobalt and nickel. Inorganic salts such as the nitrate, chloride, or sulfate may be employed. It is preferred that the said salt be a salt of a higher organic acid. Examples of the ionic component in combination with the said metal cations include the stearate, α-ethylcaproate also known as 2-ethylhexoate, dodecanoate, naphthenate, tallate (acids from tall oil), phthalate, benzoate, maleate, adipate ions, and the like. The term salt as used herein also includes other organic compounds such as cobalt acetylacetonate. A preferred group of compounds are the fatty acids having from 2-20 carbon atoms. The second component of the combination catalyst is a salt of a metal selected from the class consisting of zinc, tin, lead, vanadium, antimony, molybdenum and manganese. The second component salts may be organic or inorganic, as set forth above, but exclude the oxides or hydroxides.

The two components of the combination may be present in the range of 10 to 90% of the first component and 90 to 10% of the second component. It is preferred to use the catalyst in the proportion of 1 to 20% by weight relative to the charge of the olefin.

The combination catalyst may be dissolved or dispersed in the liquid or in a solvent such as water, benzene, or other hydrocarbons, or ethers such as diethyl ether. The present reaction may also be conducted in the presence of free acids, as set forth above which may be present in a concentration of 0.01% to 10% by weight, relative to the said salts described above.

The following examples specifically illustrate an embodiment of the present invention.

*Example 1*

The combination catalyst charged to an oxonation reactor was composed of 0.038 mole of cobalt α-ethylcaproate, and 0.031 mole of manganese α-ethylcaproate. The catalyst was provided as an 8% solution in ether. A pressure vessel was employed to carry out an oxonation in which the said combustion catalyst was contacted with 96 g. of 95:5-volume proportion-propylene-propane mixture. The reaction vessel was pressurized with a mixture of carbon monoxide and hydrogen in a 4:5 volume proportion. The vessel was then heated and the reaction initiated at 112° C. and 11,300 p.s.i. It was found that the temperature rose to 132° C. and absorption of carbon monoxide and hydrogen continued until the pressure decreased to 7,600 lbs. over a period of 35 minutes. The reaction vessel was then cooled and the gases released through cold traps. The liquid products were then distilled to give a 44.9% conversion to 2-ethyl-2-hexenal.

*Example 2*

An experiment was conducted similarly to Example 1, but using a combination catalyst of 13.2 g. of cobalt α-ethylcaproate, and 10.4 g. of zinc 2-ethylhexoate. It was found that the conversion to 2-ethyl-2-hexenal was 24.8%.

*Example 3*

A control experiment was carried out similarly to that of Example 1 employing an equivalent amount of the said cobalt α-ethylcaproate as the sole catalyst without the presence of the manganese α-ethylcaproate. It was found that the conversion to 2-ethyl-2-hexenal in this case was only 11.8 percent.

What is claimed is:

1. A process for the production of dehydrated aldols in a liquid phase process which comprises contacting an olefinic hydrocarbon having from 2 to 10 carbon atoms in the presence of carbon monoxide and hydrogen under a pressure of at least 1000 p.s.i. and at a temperature of from 100° to 180° C. in combination with from 1 to 20 percent by weight relative to the charge of the said olefin with a combination catalyst containing from 10 to 90 percent by weight of a cobalt salt and from 90 to 10 percent by weight of a manganese salt.

2. A process for the production of 2-ethyl-2-hexenal in a liquid phase process which comprises contacting propylene, carbon monoxide and hydrogen at a pressure of at least 1000 p.s.i. and at a temperature of from 100° to 180° C. in the presence of a cataylst comprising a mixture of approximately equimolecular proportions of cobalt α-ethylcaproate and manganese α-ethylcaproate.

References Cited in the file of this patent

UNITED STATES PATENTS

| | | |
|---|---|---|
| 2,517,006 | MacLean | Aug. 1, 1950 |
| 2,587,576 | Field et al. | Mar. 4, 1952 |
| 2,595,763 | Carlson et al. | May 6, 1952 |
| 2,614,128 | Mertzweiller | Oct. 14, 1952 |
| 2,811,567 | Mason | Oct. 29, 1957 |

FOREIGN PATENTS

| | | |
|---|---|---|
| 478,621 | Canada | Nov. 13, 1951 |
| 564,148 | France | Dec. 21, 1923 |

UNITED STATES PATENT OFFICE

CERTIFICATE OF CORRECTION

Patent No. 2,949,486                                                August 16, 1960

William E. Weesner et al.

It is hereby certified that error appears in the printed specification of the above numbered patent requiring correction and that the said Letters Patent should read as corrected below.

Column 2, line 28, for "combustion" read -- combination --.

Signed and sealed this 4th day of April 1961.

(SEAL)
Attest: ERNEST W. SWIDER

Attesting Officer

ARTHUR W. CROCKER
Acting Commissioner of Patents